United States Patent [19]

Primo

[11] 4,016,084

[45] Apr. 5, 1977

[54] ZOSTERA SEAWEED ARTICLES AND METHODS OF PREPARING AND UTILIZING SAME

[76] Inventor: Angelo M. Primo, 35053 Turner, Sterling Heights, Mich. 48077

[22] Filed: Feb. 14, 1975

[21] Appl. No.: 550,116

[52] U.S. Cl. .................................. 252/8.1; 71/23
[51] Int. Cl.$^2$ .................. C09K 3/28; B27K 9/00
[58] Field of Search .................. 71/1, 11, 23, 24; 252/8.1

[56] References Cited

UNITED STATES PATENTS

| 1,212,196 | 1/1917 | Earp-Thomas | 71/23 |
| 3,832,220 | 8/1974 | Plumb | 252/8.1 |

FOREIGN PATENTS OR APPLICATIONS

| 350,398 | 12/1929 | United Kingdom | 71/23 |
| 27,257 | 11/1912 | United Kingdom | 71/23 |
| 2,003 | 8/1856 | United Kingdom | 71/23 |

OTHER PUBLICATIONS

Heat Insulating Plates . . . Zostera Seaweed, Panasyak et al., Budivi Mater. Konstr., 1972(5), 8–9 (Ukrain).
The Condensed Chemical Dictionary, 8th Ed., Van Nostrand Reinhold, 1971, p. 391.

*Primary Examiner*—Charles N. Hart
*Assistant Examiner*—Ferris H. Lander
*Attorney, Agent, or Firm*—Irving M. Weiner; Pamela S. Austin; Melvin Yedlin

[57] ABSTRACT

Products having as an essential ingredient thereof a special seaweed known as eel grass. Such seaweed has been found to surprisingly constitute a flame-retardant, vermin-proof, sound-proof, rot-proof, weather-proof, and bug-proof material. Such seaweed is also very beneficial as a soil conditioner and fertilizer. The novel products including such eel grass include a blanket-type material, a board-like sheet material, a spray-type composition, a paint-type composition, and as a filler for cavities in building walls.

10 Claims, No Drawings

ZOSTERA SEAWEED ARTICLES AND METHODS OF PREPARING AND UTILIZING SAME

The present invention relates generally to products having as an essential ingredient thereof a predetermined quantity and arrangement of an aquatic plant belonging to the genus Zostera, and methods of preparing and using such products. In particular, the present invention relates to products which include a special type of seaweed known as eel grass.

CROSS-REFERENCE TO A RELATED APPLICATION

The present application is related to U.S. Pat. application Ser. No. 550,117, filed simultaneously herewith, and having the same inventor and owner as the present application, and being entitled "SEAWEED COMPOSITION AND METHODS OF PREPARING AND UTILIZING SAME", the entire disclosure of which is incorporated herein by reference thereto.

BACKGROUND OF THE INVENTION

Heretofore, various varieties of seaweed have been known for long periods of time, but relatively little use has been made of seaweed. In the main, the prior art attempts to obtain some beneficial use from seaweed have been unsuccessful. Notwithstanding the relative success or lack thereof of such prior art attempts, there is set forth hereinbelow a discussion of the prior art attempts.

U.S. Pat. No. 1,212,196 patented on Jan. 16, 1917 by George H. Earp-Thomas and entitled "FERTILIZER COMPOSITION AND PROCESS OF MAKING SAME" discloses a process of forming a fertilizer which consists of grinding eel grass, grinding phosphate rock, and throughly mixing the two together. Earp-Thomas also dicloses a fertilizer containing eel grass and additional amounts of phosphate, and compounds of potassium and nitrogen. The patent states that one of the principal ingredients of the composition is Zostera Marina, or what is commonly known as eel grass.

The Earp-Thomas patent fails to disclose or suggest the flame-retardant, or sound-proof qualities of eel grass, and also fails to disclose any pelletizing or encapsulating of the fertilizer product, nor any combination of the fertilizing substances or the binder.

U.S. Pat. No. 2,075,768 patented on Mar. 30, 1937 by Steven Wilson and entitled "FIBER COMPOSITION AND METHOD OF MAKING THE SAME" discloses various cellulous compositions which are used in flame-retardant materials, but the cellulous compositions themselves are not flame-resistant or flame-retardant. The Wilson patent disloses a fiber composition made by disintegrating or shredding ground vegetable matter, and combining with a binder, and wherein the compositon may be substituted for hard rubber, bakelite, and may be rolled into sheets or pressed into any desired shape and may be worked upon and machined with perfect freedom. The Wilson invention also contemplates the incorporation of germ-killing ingredients in dry form.

The Wilson patent does not disclose the use of eel grass in any form whatsoever, nor the use of any vegetable matter which itself is flame-retardant, or fireproof, or rot-proof.

U.S. Pat. No. 2,523,626 patented on Sept. 26, 1950 by Grinnell Jones and Samuel Soll and entitled "FIRE-RETARDANT COMPOSITIONS AND PROCESS" dicloses a composition which is fire-retardant, heat-insulating, and may possess water- and moisture-repellence, as well as the ability to be suspended, dispersed or dissolved in an aqueous media. The composition according to this patent may include a foam-producing substance and may be applied as a surface coating.

Although the aforementioned Jones et al patent does disclose a fire-retardant composition which includes a protein, it fails to disclose the use of any seaweed whatsoever, nor does it contemplate or suggest the mixing of the composition with foam rubber or the possibility of weaving the composition into a fabric, nor the qualities of being vermin-proof or bugproof.

U.S. Pat. No. 2,940,942 patented on June 14, 1960 by Olaus T. Hodnefield and entitled "FIRE RETARDANT COMPOSITION COMPRISING GILSONITE, MINERAL FILLER AND FATTY ACID SOAP" dicloses fire-retardant compositions which are adapted to be applied in a dilluted state, as by dipping or spraying, to make the surface flame-resistant. Hodnefield also contemplates the use of additives to make the composition insector fungus-retardant, and also contemplates using the solution to treat burlap, roofing felt and the like. The Hodnefield patent also contemplates the composition as an insulator, and for use by spray painting.

Hereagain, the Hodnefield patent also fails to disclose the use of any seaweed whatsoever, nor any rotproof or bugproof composition.

U.S. Pat. No. 3,050,424 patented on Aug. 21, 1962 by Milton G. Schmitt and entitled "FLAMEPROOF SHEET" discloses an improved flameproof sheet which may also be used as an insulation material. The Schmitt invention discloses that the sheet is to be used as a backing sheet for insulation, as a building paper to provide a vapor barrier.

Hereagain, the Schmitt patent also fails to disclose the use of any seaweed whatsoever, nor the use of eel grass to produce a sound-proof, flame-proof, flame-retardant, and vermin-proof material.

SUMMARY OF THE INVENTION

The present invention provides a product which includes as an essential ingredient thereof a predetermined quantity and arrangement of an aquatic plant belonging to the genus Zostera.

It is an object of the present invention to provide small particles of dried eel grass for mixing with a fluid carrier so that the resulting composition may be utilized as a spray or a coating.

Another object of the present invention is to provide a product which is fabricated from seaweed into a blanket-type material for insulating, flame-retarding, sound-proofing, and/or weather-proofing purposes.

It is yet a further object of the present invention to provide a mixture of dried seaweed particles in a binder which is then pelletized for disposal in cavities in building walls, or between buildings, or between apartments or rooms for insulation purposes.

An additional object of the present invention is to mix a hardening or setting catalyst with a composition of small seaweed particles and liquid carrier so that the resulting composition may be poured in liquid form for subsequent setting or hardening.

Another object of the present invention is to provide granulated dried eel grass for use as a soil conditioner and fertilizer.

A further object of the present invention is to provide an aquatic plant which is woven to form a fabric which is vermin-proof, rot-proof, bug-proof, and possesses substantial insulating characteristics.

One of the embodiments of the present invention involves mixing eel grass with foam rubber to increase the flame-retardant characteristic of the resulting product.

It is another object of the present invention to provide eel grass in a liquid carrier which is selected from the group consisting of paint, a fabric spray, a carpet spray, and a hardening agent.

It is another object of the present invention to provide an aquatic plant belonging to the genus Zostera for forming into rigid sheets similar to press-board.

Other objects and advantages of the present invention will appear from the specification description and appended claims set forth hereinbelow.

DETAILED DESCRIPTION OF SOME PREFERRED EMBODIMENTS OF THE PRESENT INVENTION

Before explaining the present invention in detail, it is to be understood that the invention is not limited in its application to the details of the preferred embodiments set forth hereinbelow, because the present invention is capable of other embodiments and of being practiced or carried out in various ways. Also, it is to be understood that the phraseology or terminology employed herein is for the purpose of description and not of limitation.

In view of the fact that the primary ingredient in the products according to the principles of the present invention is a specific and predetermined type of seaweed, there is set forth hereinbelow the chemical analysis of the type of seaweed which constitutes the preferred ingredient in practicing the present invention.

EXAMPLE NO. 1

| | |
|---|---|
| Total Nitrogen: | 0.69 % |
| Total Phosphorus: | 0.118% |
| Potash (Potassium Carbonate): | 16.29 % |
| Minerals: | |
| Potassium: | 2.33 % |
| Phosphorus: | 0.118% |

It should be carefully noted that although the present invention relates generally to the use of all aquatic plants belonging to the genus Zostera, the chemical analysis of the seaweed of Example No. 1 as set forth hereinabove relates to a particular member of such genus, such particular member being known as eel grass, or grass wrack, or tape grass. The seaweed of Example No. 1 is green in color when it is wet, and is black in color when it is dry.

The genus Zostera is a small genus of widely distributed marine plants (family Potamogetonaceae) with branching stems, distichous leaves, and monoecious flowers that are borne in a spabix. It has been discovered that such aquatic plants exhibit the very surprising and unexpected properties of being flame-retardant, vermin-proof, sound-proof, rot-proof and bug-proof.

In accordance with a first preferred embodiment of the present invention, the seaweed, of the type hereinabove described, is collected and dried. Thereafter, the dried seaweed is then reduced to form small particles thereof. The small particles of the dried seaweed is then admixed with a fluid carrier therefor so that the resulting composition may be utilized by spraying. Such spray may be applied on fabrics, carpets or mixed with paint for paint spraying, in order to apply a coat of a flame-retardant and sound-proof material. In this manner, the present invention may be beneficially utilized to eliminate, or at least reduce significantly, destruction of a myriad of coated items to which the novel spray is applied.

In accordance with a second preferred embodiment of the present invention, the above-identified seaweed may be woven into a flame-retardant fabric. As an alternate embodiment, such seaweed may be made into sheets, or pressed into a board-like material similar to press-board.

In accordance with a further preferred embodiment of the present invention, the above-identified seaweed may be combined with a suitable binder to be formed into bricks or blocks which possess extraordinarily high insulation, sound-proofing, and flame-retardant properties.

In accordance with yet a further preferred embodiment of the invention, the above-identified preferred seaweed is formed into small dry particles, and then mixed with a setting or hardening catalyst, and then dispersed in a liquid form for pouring. The poured composition will then set or harden into an excellent filler material which is flame-retardant, bug-proof and sound-proof.

Pursuant to another preferred embodiment of the present invention, small particles of the dried seaweed, which is described hereinabove, are mixed with foam rubber to make the resulting foam rubber product flame-retardant.

It has also been discovered that the Zostera marina seaweed may surprisingly make previously non-growable soil, very readily suitable for growing crops and the like. In accordance with another embodiment of the present invention, the mentioned seaweed is dried and milled to be sold in bulk as a fertilizer and soil conditioner. As an alternate embodiment of the fertilizer aspect of the invention, such milled or granulated eel grass particles may be combined with a binder, and/or predetermined quantities of additional potash, nitrogen, phosphorus or vitamines, to be subsequently encapsulated or pelletized to produce a time-released soil conditioner.

Furthermore, the present invention embraces the concept of forming the eel grass particles into pellets for disposal in cavities in building walls, or between buildings, apartments, rooms, or the like. Such pellets and structure form an excellent weather-proofing, flame-retardant, and sound-proof arrangement.

According to yet another preferred embodiment of the present invention, the composition of materials as hereinabove described are admixed with a binder, and then formed into very hard stakes or spikes. Such stakes or spikes have sufficient strength to be driven or hit into the ground without fracturing. In accordance with this embodiment of the invention, a series of such stakes may be driven into the ground surrounding a tree or bush-like plant. For example, a series of four equally-spaced stakes may be driven around the tree in question, and the stakes or spikes will then slowly and periodically release, with the passage of time, the ingredients into the adjacent soil and ultimately into the tree in question.

The present invention also contemplates an embodiment, such as the one described hereinabove in connection with the liquid carrier, wherein the resultant liquid product is sprayed onto any desired location, plants, trees, or soil.

The products of the present invention are very economical to manufacture, and are also economical to ship, use and apply.

It is believed that with the above description, the novel features of the present invention will be apparent. For a definition of the scope of the invention, reference should be had to the appended claims.

I claim:

1. A flame-retardant product consisting essentially of:
   a predetermined quantity and arrangement of an aquatic plant belonging to the genus Zostera;
   said aquatic plant being dried;
   said dried aquatic plant being then reduced to form small particles thereof; and
   said small particles of said dried aquatic plant being then admixed with a carrier.

2. A product characterized substantially in accordance with claim 1 wherein:
   said carrier is a fluid so that the resulting mixture may be applied by spraying.

3. A product characterized substantially in accordance with claim 2, wherein:
   a hardening or setting catalyst being added to said mixture so that the resulting admixture may be poured in liquid form for subsequent setting or hardening.

4. A product characterized in accordance with claim 2, wherein:
   said mixture is a material selected from the group consisting of paint, a fabric spray, a carpet spray and a hardening agent.

5. A product characterized substantially in accordance with claim 1, wherein:
   said carrier is a binder resulting in a hard homogeneous composition.

6. A product characterized substantially in accordance with claim 5, wherein:
   said composition being made into a blanket-type material for insulating, flame-retarding, sound-proofing, and/or weather-proofing purposes.

7. A product characterized substantially in accordance with claim 5, wherein:
   said composition being pelletized for disposal in cavities in building walls, or between buildings, or between apartments or rooms for insulation purposes.

8. A product characterized substantially in accordance with claim 5, wherein:
   said composition being made into rigid sheets similar to press-board.

9. A product characterized substantially with claim 5, wherein:
   said composition being shredded and then being woven to form a fabric thereof which is vermin-proof, rot proof, bug proof and possesses substantial insulating characteristics.

10. A product characterized substantially in accordance with claim 1, wherein:
    said carrier being a binder intermixed with foam rubber.

* * * * *